Patented Jan. 9, 1951

2,537,871

UNITED STATES PATENT OFFICE 2,537,871

2-AMINOQUINOXALINE AND PROCESS OF PREPARING SAME

Frank J. Wolf, Westfield, N. J., assignor to Merck & Co., Inc., Rahway, N. J., a corporation of New Jersey No Drawing. Original application July 3, 1946, Serial No. 681,421. Divided and this application February 18, 1950, Serial No. 145,099

4 Claims. (Cl. 260—250)

This application is a division of my copending application Serial No. 681,421, filed July 3, 1946.

This invention relates to processes for preparing sulfa drugs such as sulfaquinoxaline and derivatives thereof, and particularly to an improved process for preparing the intermediate 2-aminoquinoxaline through new intermediate 2-haloquinoxalines.

The production of 2-sulfanilamidoquinoxaline (sulfaquinoxaline) and derivatives thereof through the intermediate 2-aminoquinoxaline is disclosed in a publication by Weijlard, Tishler and Erickson, J. A. C. S., 66, 1957 (1944). According to this publication, 2-aminoquinoxaline has previously been prepared from alloxazine, either directly by cleavage with sulfuric acid or indirectly by cleavage with concentrated ammonia followed by decarboxylation of the 2-amino-3-carboxyquinoxaline thus formed. A serious drawback of this process is that alloxazine is a relatively scarce and costly material.

It has been discovered, in accordance with the present invention, that 2-aminoquinoxaline can be prepared in an efficient and practical way starting with the readily available material o-phenylene diamine by reacting the same with a compound of the class consisting of glyoxalic acid, lower alkyl glyoxalates, and the addition product of glyoxalic acid and sodium bisulfite to form 2-hydroxyquinoxaline; converting the 2-hydroxy compound to a 2-haloquinoxaline by reaction with phosphorous halides; and heating the 2-haloquinoxaline with alcoholic ammonia, under pressure, to form the desired 2-aminoquinoxaline.

In carrying out the process of the present invention, o-phenylene diamine and n-butyl glyoxalate, or other glyoxalic compound of the class above noted, are heated together in aqueous medium and the precipitate thus formed is dissolved in dilute alkali such as 1 N sodium hydroxide, treated with decolorizing charcoal, reprecipitated by acidification as, for example, with acetic acid, removed by filtration, and dried.

A mixture of dried 2-hydroxyquinoxaline and phosphorous halides such as phosphorous pentachloride and phosphorous oxychloride, or phosphorous pentabromide and phosphorous oxybromide, is heated to about 130° C. until the reaction mixture is completely liquified, and heating is continued for about 45 minutes longer. The reaction mixture is then cooled and finally poured over ice with stirring, causing precipitation of a 2-haloquinoxaline such as 2-chloroquinoxaline or 2-bromoquinoxaline which can be purified by sublimation.

The 2-haloquinoxaline is converted to 2-aminoquinoxaline by mixing with an inert solvent such as methanol, ethanol, or the like, saturated with ammonia, and heating the mixture under pressure at about 120° C. for about eight hours. The reaction mixture is then evaporated to dryness and 2-aminoquinoxaline, melting at about 154–155° C. is recovered by recrystallization from benzene, ethanol, ethanol - water, benzene-ethanol, or the like.

The foregoing reactions can be graphically indicated as follows:

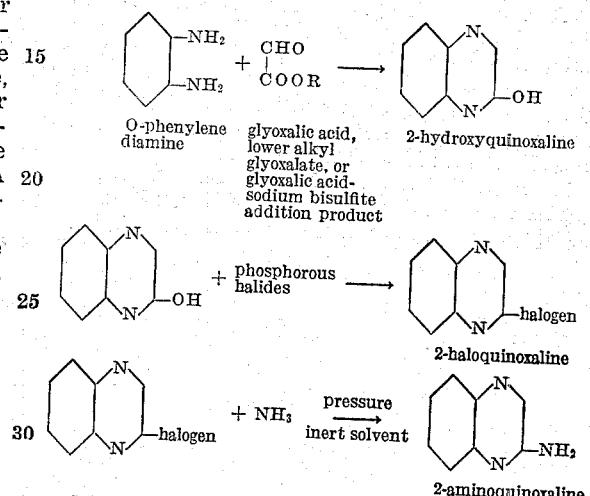

The following examples indicate in greater detail how procedures of the present invention are carried out, and it will be understood that these examples are given by way of illustration and not of limitation.

Example I

A mixture of 6.5 g. of n-butyl glyoxalate, 5.4 g. of o-phenylene diamine, and 100 ml. of water was stirred for 15 minutes and then heated at 50° C. for an additional 15 minutes. The precipitate thus formed was taken up in 100 ml. of 1.0 N sodium hydroxide, treated with "Norite" (decolorizing charcoal) and the product was re-precipitated by acidification with acetic acid, yielding 5.5 g. of 2-hydroxyquinoxaline (74.5% yield), melting at 268–269° C.

The preparation of 2-hydroxyquinoxaline, as described in Example I, proceeds in the same way when glyoxalic acid, the addition product of glyoxalic acid and sodium bisulfite, or other lower alkyl glyoxalates are used in place of the n-butyl glyoxalate.

Example II

A mixture of 2.45 g. of 2-hydroxyquinoxaline, 3.65 g. of phosphorous pentachloride, and 12.5 ml. (about 21 g.) of phosphorous oxychloride was heated at 130° C. until all the solid had dissolved, and then for 45 minutes longer. The solution was cooled and poured slowly, with stirring, onto 100 g. of ice. The precipitated 2-chloroquinoxaline thus formed weighed 2.4 g. (87% yield) and had a melting point, after purification by sublimation, of 47.5° C.

When 2-hydroxyquinoxaline is reacted with phosphorous pentabromide and phosphorous oxybromide in accordance with the procedure described in Example II, 2-bromoquinoxaline is obtained in like manner.

Example III

A mixture of 37 g. of 2-chloroquinoxaline and 300 ml. of methanol saturated with 36 g. of ammonia was heated under pressure at about 120° C. for about eight hours. The reaction mixture was then concentrated to dryness, yielding 31 g. of crude 2-aminoquinoxaline (95% yield). After recrystallization from benzene-ethanol, the product melted at 154–155° C.

In the foregoing procedures the overall yield of 2-aminoquinoxaline, based upon o-phenylene diamine, is of the order of 40 to 50%. An important factor in providing a good overall yield is the use of phosphorous pentachloride and phosphorous oxychloride in combination. The process will work reasonably well using either the pentahalide or the oxyhalide alone, but the use of the two phosphorus halides together gives a crude product which is cleaner and more easily purified than the product obtained by using either of the phosphorous halides alone.

The improved process of the present invention applies also to the preparation of derivatives of 2-aminoquinoxaline. Thus, by suitably varying the starting materials, the following derivatives of 2-aminoquinoxaline have been prepared: 3-methyl, 6-methyl, 7-methyl, 5-(or 8-) methyl, 6-methoxyl, 7-methoxyl, 5-(or 8-) methoxyl, 6-chloro, 7-chloro, 5-(or 8-) chloro, 6-nitro, 7-nitro, 6-bromo, 7-bromo, and 6-(or 7-) carboxy. While these derivatives are potentially useful organic intermediates, they are not as suited as 2-aminoquinoxaline itself in the preparation of physiologically active sulfanilamido compounds.

Modifications may be made in carrying out the present invention without departing from the spirit and scope thereof, and I am to be limited only by the appended claims.

I claim:

1. The process that comprises reacting a 2-haloquinoxaline of the class consisting of 2-chloroquinoxaline and 2-bromoquinoxaline with ammonia, and recovering the 2-aminoquinoxaline thus formed.

2. The process that comprises reacting a 2-haloquinoxaline of the class consisting of 2-chloroquinoxaline and 2-bromoquinoxaline with ammonia in inert organic solvent under pressure, and recovering the 2-aminoquinoxaline thus formed.

3. The process that comprises reacting 2-chloroquinoxaline with ammonia in inert organic solvent under pressure, and recovering the 2-aminoquinoxaline thus formed.

4. The process that comprises heating 2-chloroquinoxaline with alcoholic ammonia under pressure, and recovering the 2-aminoquinoxaline thus formed.

FRANK J. WOLF.

REFERENCES CITED

The following references are of record in the file of this patent:

Gowenlock et al., J. Chem. Soc. (1945), 622–625.